(12) United States Patent
Kim et al.

(10) Patent No.: US 11,987,118 B2
(45) Date of Patent: May 21, 2024

(54) FOLDABLE ACCELERATOR PEDAL APPARATUS FOR VEHICLE WITH HYSTERESIS MODULE

(71) Applicants: HYUNDAI MOTOR COMPANY, Seoul (KR); KIA MOTORS CORPORATION, Seoul (KR); Kyung Chang Industrial Co., Ltd., Daegu (KR)

(72) Inventors: Eun Sik Kim, Gwangmyeong-si (KR); Hyeon Uk Kim, Daegu (KR); Ji Soo Kim, Daegu (KR)

(73) Assignees: HYUNDAI MOTOR COMPANY, Seoul (KR); KIA MOTORS CORPORATION, Seoul (KR); Kyung Chang Industrial Co., Ltd., Daegu (KR)

( * ) Notice: Subject to any disclaimer, the term of this patent is extended or adjusted under 35 U.S.C. 154(b) by 708 days.

(21) Appl. No.: 17/147,920

(22) Filed: Jan. 13, 2021

(65) Prior Publication Data

US 2022/0055477 A1  Feb. 24, 2022

(30) Foreign Application Priority Data

Aug. 20, 2020  (KR) .................. 10-2020-0104748

(51) Int. Cl.
*B60K 26/02* (2006.01)
*G05G 1/30* (2008.04)
(Continued)

(52) U.S. Cl.
CPC ............ *B60K 26/02* (2013.01); *B60K 26/021* (2013.01); *G05G 1/44* (2013.01); *G05G 5/03* (2013.01);
(Continued)

(58) Field of Classification Search
CPC .. G05G 1/44; G05G 1/46; G05G 5/03; G05G 5/28; G05G 25/04; B60K 26/02;
(Continued)

(56) References Cited

U.S. PATENT DOCUMENTS 1,156,990 A    10/1915  Foljambe
6,179,079 B1    1/2001  Basnett
(Continued)

FOREIGN PATENT DOCUMENTS

| FR | 2981889 A1 | 5/2013 | |
| GB | 2477123 A  * | 7/2011 | ........... B60R 25/005 |
| KR | 10-2017-0137427 A | 12/2017 | |

OTHER PUBLICATIONS

Notice of Allowance issued in related U.S. Appl. No. 17/147,880, dated Dec. 29, 2021 (11 pages).
(Continued)

*Primary Examiner* — Adam D Rogers
(74) *Attorney, Agent, or Firm* — Lempia Summerfield Katz LLC

(57) ABSTRACT

A foldable accelerator pedal apparatus for a vehicle includes: a pedal housing fixedly installed in a lower space of a driver seat, a pedal pad rotatably coupled to the pedal housing, and a hysteresis module to generate hysteresis when a driver manipulates the pedal pad. In a manual driving mode in which a driver directly drives the vehicle, the pedal pad 200 protrudes from the pedal housing 100 and is popped up to be exposed to the driver, and in an autonomous driving mode in which the driver does not directly drive the vehicle, the pedal pad 200 is inserted into the pedal housing 100 and is in a hidden (hide) state in which the exposure to the driver is blocked. It is possible to implement hysteresis through the hysteresis module 300 when the pedal pad 200 is manipulated.

18 Claims, 10 Drawing Sheets

(51) Int. Cl.
*G05G 1/44* (2008.04)
*G05G 5/03* (2008.04)
*G05G 5/28* (2006.01)

(52) U.S. Cl.
CPC .......... *B60K 2026/026* (2013.01); *G05G 5/28* (2013.01)

(58) Field of Classification Search
CPC .......... B60K 26/021; B60K 2026/026; B60W 60/0015; B60W 60/0053
See application file for complete search history.

(56) References Cited

U.S. PATENT DOCUMENTS

| | | | |
|---|---|---|---|
| 6,182,525 | B1 | 2/2001 | Bowers et al. |
| 6,364,047 | B1 | 4/2002 | Bortolon |
| 9,283,934 | B2 | 3/2016 | Shand |
| 9,342,092 | B2* | 5/2016 | Baur ........................ G05G 1/40 |
| 10,220,703 | B2* | 3/2019 | Viethen ................ B60K 26/021 |
| 10,739,011 | B2 | 8/2020 | Cowan et al. |
| 10,889,226 | B1 | 1/2021 | Dean et al. |
| 10,906,514 | B1 | 2/2021 | Kim et al. |
| 10,913,419 | B2 | 2/2021 | Mullen et al. |
| 10,946,741 | B1* | 3/2021 | Kim ........................... B60T 7/06 |
| 10,988,097 | B2 | 4/2021 | Ghaffari et al. |
| 10,994,611 | B1* | 5/2021 | Kim ......................... G05G 5/28 |
| 11,021,058 | B1* | 6/2021 | Kim ......................... G05G 5/28 |
| 11,225,226 | B1* | 1/2022 | Kim ......................... B60T 7/042 |
| 11,249,506 | B1* | 2/2022 | Kim ......................... G05G 5/28 |
| 11,305,647 | B2* | 4/2022 | Kim ......................... G05G 5/28 |
| 11,327,520 | B1* | 5/2022 | Kim ......................... G05G 5/05 |
| 11,565,725 | B2* | 1/2023 | Kim ......................... B60T 7/12 |
| 11,602,990 | B1* | 3/2023 | Kim ......................... B60T 7/042 |
| 11,613,236 | B2* | 3/2023 | Kim ......................... B60T 7/042 74/513 |
| 2001/0015111 | A1 | 8/2001 | Rixon et al. |
| 2003/0110879 | A1 | 6/2003 | Massey et al. |
| 2004/0259687 | A1 | 12/2004 | Ritter et al. |
| 2008/0004806 | A1 | 1/2008 | Kimura et al. |
| 2008/0141820 | A1 | 6/2008 | Park et al. |
| 2008/0147287 | A1 | 6/2008 | Park et al. |
| 2009/0223319 | A1 | 9/2009 | Choi |
| 2010/0139445 | A1 | 6/2010 | Kim et al. |
| 2011/0132134 | A1 | 6/2011 | Kim et al. |
| 2013/0125682 | A1 | 5/2013 | Kim et al. |
| 2014/0311278 | A1 | 10/2014 | Min et al. |
| 2014/0316648 | A1 | 10/2014 | Min |
| 2014/0373667 | A1 | 12/2014 | Kim |
| 2015/0107402 | A1 | 4/2015 | Leem |
| 2015/0253804 | A1 | 9/2015 | Baur et al. |
| 2016/0311321 | A1 | 10/2016 | Maruyama et al. |
| 2016/0347241 | A1 | 12/2016 | Gralto |
| 2017/0320501 | A1 | 11/2017 | Li et al. |
| 2018/0093675 | A1 | 4/2018 | Holub et al. |
| 2019/0118852 | A1 | 4/2019 | Suzuki et al. |
| 2019/0310678 | A1 | 10/2019 | Wojciechowski et al. |
| 2020/0269861 | A1 | 8/2020 | Liffman et al. |
| 2020/0317152 | A1 | 10/2020 | Ghaffari et al. |
| 2020/0398725 | A1 | 12/2020 | Mullen et al. |
| 2021/0061312 | A1 | 3/2021 | Wang |
| 2021/0146899 | A1 | 5/2021 | Bayer |
| 2022/0144224 | A1 | 5/2022 | Tarandek et al. |

OTHER PUBLICATIONS

Notice of Allowance issued in related U.S. Appl. No. 17/146,048, dated Sep. 12, 2023; 10pp.

Non Final Office Action issued in related U.S. Appl. No. 17/010,371, dated Jul. 7, 2022 (20 pages).

Non Final Office Action issued in related U.S. Appl. No. 17/146,048, dated Mar. 20, 2023; 35pp.

* cited by examiner

FOLDABLE ACCELERATOR PEDAL APPARATUS FOR VEHICLE WITH HYSTERESIS MODULE

CROSS REFERENCE TO RELATED APPLICATION

The present application claims priority to and the benefit of Korean Patent Application No. 10-2020-0104748, filed on Aug. 20, 2020, the entire contents of which are incorporated herein by reference.

FIELD

The present disclosure relates to a foldable accelerator pedal apparatus for a vehicle with a hysteresis module.

BACKGROUND

The statements in this section merely provide background information related to the present disclosure and may not constitute prior art.

An autonomous vehicle is a smart vehicle that incorporates an autonomous driving technology that allows the vehicle to reach its destination even in a case in which a driver does not directly manipulate a steering wheel, an accelerator pedal, and a brake. In recent years, development of the autonomous vehicle has been progressing rapidly.

When an autonomous driving situation is universally realized, it is possible to select a manual driving mode in which the driver directly drives, and an autonomous driving mode in which the vehicle drives to a destination by itself without the driver directly driving.

In the autonomous driving mode, the driver should be able to rest comfortably by extending his/her feet, and therefore, if the pedals (an accelerator pedal and a brake pedal) located in a lower space of a driver's seat remain exposed indoors, there is a disadvantage that the pedals interfere with the driver's rest.

In addition, the autonomous driving situation is a situation in which the driver does not manipulate the vehicle's pedals (the accelerator pedal and the brake pedal), and if the driver manipulates the pedals during autonomous driving, a vehicle controller ends the autonomous driving and determines a situation in which the driver wants to drive directly, and ends control for autonomous driving.

However, since the pedals of the vehicle are installed to be exposed to the lower space of the driver's seat, we have found that the driver may unconsciously manipulate the pedals in the autonomous driving situation (mal-operation situation of the pedals), and in this case, there is a concern of an accident depending on road conditions or a distance between vehicles.

The contents described as the related art have been provided only to assist in understanding the background of the present disclosure and should not be considered as corresponding to the related art known to those having ordinary skill in the art.

SUMMARY

The present disclosure provides a foldable accelerator pedal apparatus that protrudes a pedal pad from a pedal housing and thus exposing the pedal pad toward a driver so that the driver may manipulate the pedal pad in a manual driving mode in which the driver directly drives, blocks exposure to the driver by inserting the pedal pad into the pedal housing so that the manipulation by the driver is impossible in an autonomous driving situation, and includes a hysteresis module so that hysteresis may be implemented, in which a comfortable rest for the driver is possible in the autonomous driving situation, and furthermore, safety may be improved by blocking mal-operation of pedals in the autonomous driving situation.

Further, the present disclosure provides a configuration in which a straight type motor fixed to a pedal housing is accommodated in an inner space of a pedal pad when the pedal pad is in a hidden (hide) state inserted into the pedal housing, thereby having an efficient layout structure to significantly reduce an overall external size of an accelerator pedal apparatus.

According to one form of the present disclosure, a foldable accelerator pedal apparatus for a vehicle with a hysteresis module includes: a pedal housing fixedly installed in a lower space of a driver's seat; a pedal pad having one end rotatably coupled to the pedal housing and manipulated by a foot of a driver; the hysteresis module having one end rotatably installed on the pedal housing at a fixed position in the pedal housing and generating hysteresis when the driver manipulates the pedal pad; a straight type motor fixedly installed in the pedal housing and including a motor rod that advances and retreats; and a rotation link that is rotatably coupled to the pedal pad, is connected to the motor rod, and operates to contact the hysteresis module or release the contact when the motor rod advances and retreats, wherein the pedal pad is changed to a hidden (hide) state inserted into the pedal housing and a pop-up state protruding from the pedal housing through rotation of the rotation link by the advance and retreat of the motor rod.

The foldable accelerator pedal apparatus for a vehicle may include a motor control printed circuit board (PCB) that is fixedly installed on the pedal housing and is electrically connected to the straight type motor to control an operation of the straight type motor.

The pedal pad may be provided with an inner space opened downward, and when the pedal pad is changed from the pop-up state to the hidden state, the straight type motor may be inserted into the inner space of the pedal pad.

The pedal pad may be an organ type pad having a lower end thereof rotatably coupled to the pedal housing via a hinge pin, connected to the rotation link at an upper portion of the hinge pin, and having an upper end rotating back and forth around the hinge pin.

The foldable accelerator pedal apparatus for a vehicle may further include a hinge spring having both ends fixed to the pedal housing and the hinge pin to provide an elastic force to the pedal pad so that the pedal pad rotates in a direction into which the pedal pad is inserted into the pedal housing, wherein when the contact with the hysteresis module is released due to rotation of the rotation link by the operation of the straight type motor, the pedal pad is rotated to be inserted into the pedal housing around the hinge pin by the elastic force of the hinge spring and is changed to the hidden (hide) state.

A rod hole extending along a longitudinal direction of the motor rod may be formed in the motor rod to penetrate therethrough, a link hole extending along a longitudinal direction of the rotation link may be formed in the rotation link to penetrate therethrough, the rotation link may penetrate through the rod hole in a vertical direction so that an upper end thereof is rotatably coupled with the pedal pad via a pad connection pin, and the motor rod and the rotation link may be connected to each other via a link connection pin coupled to the motor rod while penetrating through the link hole.

The lower end of the rotation link protruding to a lower side of the rod hole may be in contact with the hysteresis module or the contact thereof may be released when the rotation link is rotated by the advance and retreat of the motor rod, and when the lower end of the rotation link is released from contact with the hysteresis module, the pedal pad may rotate to be inserted into the pedal housing and may be changed to the hidden (hide) state, and when the lower end of the rotation link is in contact with the hysteresis module, the pedal pad may be changed to the pop-up state protruding from the pedal housing by a pushing operation of the rotation link.

The link hole may be formed in a fan-shaped cross section whose cross-sectional area gradually increases from the lower end facing the hysteresis module to an upper end facing the pad connection pin based on the state in which the pedal pad is popped up.

A link protrusion may be formed to protrude on one surface of the rotation link, and the link protrusion may be positioned in the rod hole while being positioned below the pad connection pin when the pedal pad is in the hidden (hide) state, and maintain a contact state with one end of the rod hole in the rod hole.

The hysteresis module may include: a lever member having one end of a hinge portion rotatably coupled to the pedal housing via a central shaft, and the other end provided with a seating groove portion so that the lower end of the rotation link is seated when the pedal pad is popped up, a friction bush that is coupled to the central shaft and generates a friction force by contact with the lever member when the lever member rotates, and a lever spring having both ends installed to be supported by the pedal housing and the lever member to provide an elastic force to the lever member so that the lever member rotates toward the pedal pad.

The seating groove portion of the lever member may be formed in an arc shape surrounding the lower end of the rotation link, and the seating groove portion and an upper surface of the lever member may be connected by an inclined surface.

In one form, the lever member includes a lever protrusion protruding outward from an end portion where the seating groove portion is formed in the lever member, a stopper protrusion may be formed on the pedal housing, and when the pedal pad is in the hide state and the pop-up state, the rotation of the lever member toward the pedal pad may be restricted due to a contact between the lever protrusion and the stopper protrusion.

The foldable accelerator pedal apparatus for a vehicle may further include a pad spring having both ends fixed to the pedal pad and the pad connection pin to provide an elastic force to the rotation link so that the lower end of the rotation link faces the seating groove portion of the lever member.

The foldable accelerator pedal apparatus for a vehicle may further include: a permanent magnet coupled to the hinge portion of the lever member; and an acceleration control PCB fixedly installed on the pedal housing so as to face the permanent magnet, wherein the acceleration control PCB generates a signal related to acceleration by detecting a rotation angle of the pedal pad through a change in magnetic field strength according to a change in a position of the permanent magnet when the lever member rotates.

When the motor rod retreats to be inserted into the straight type motor by the operation of the straight type motor, the rotation link rotates around the pad connection pin when the motor rod retreats, and the lower end of the rotation link is seated on the seating groove portion of the lever member, the pedal pad may be in the pop-up state by rotating to protrude from the pedal housing.

When the motor rod advances to protrude from the straight type motor by the operation of the straight type motor, the rotation link rotates around the pad connection pin when the motor rod advances, and the contact between the lower end of the rotation link and the lever member is released, the pedal pad may be in the hidden (hide) state by rotating to be inserted to the pedal housing.

When the rotation link and the hysteresis module rotate due to the advance and retreat of the motor rod according to the operation of the straight type motor, and the position of the permanent magnet is changed due to the rotation of the hysteresis module, the acceleration control PCB may not generate the signal related to acceleration to prevent a malfunction.

In a situation in which the pedal pad is in the pop-up state and the straight type motor is not operated, only when the pedal pad rotates by the manipulation of the driver, the rotation link moves linearly by the rotation of the pedal pad, the hysteresis module rotates by the linear movement of the rotation link, and the position of the permanent magnet is changed due to the rotation of the hysteresis module, the acceleration control PCB may generate the signal related to acceleration.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
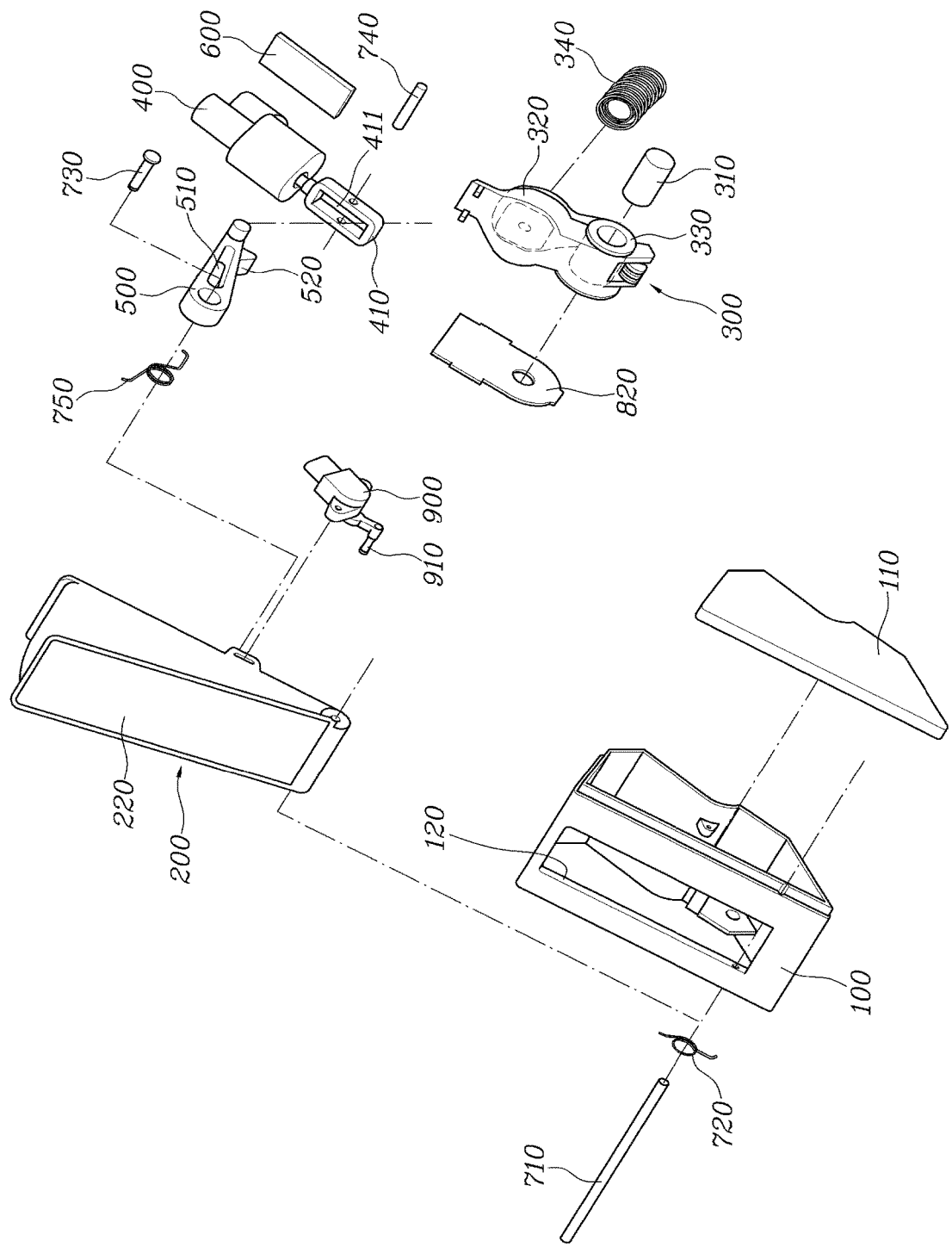
FIG. 1 is an exploded perspective view of an apparatus including a hysteresis module and a straight type motor as a foldable accelerator pedal apparatus according to one form of the present disclosure.
Figure 2:
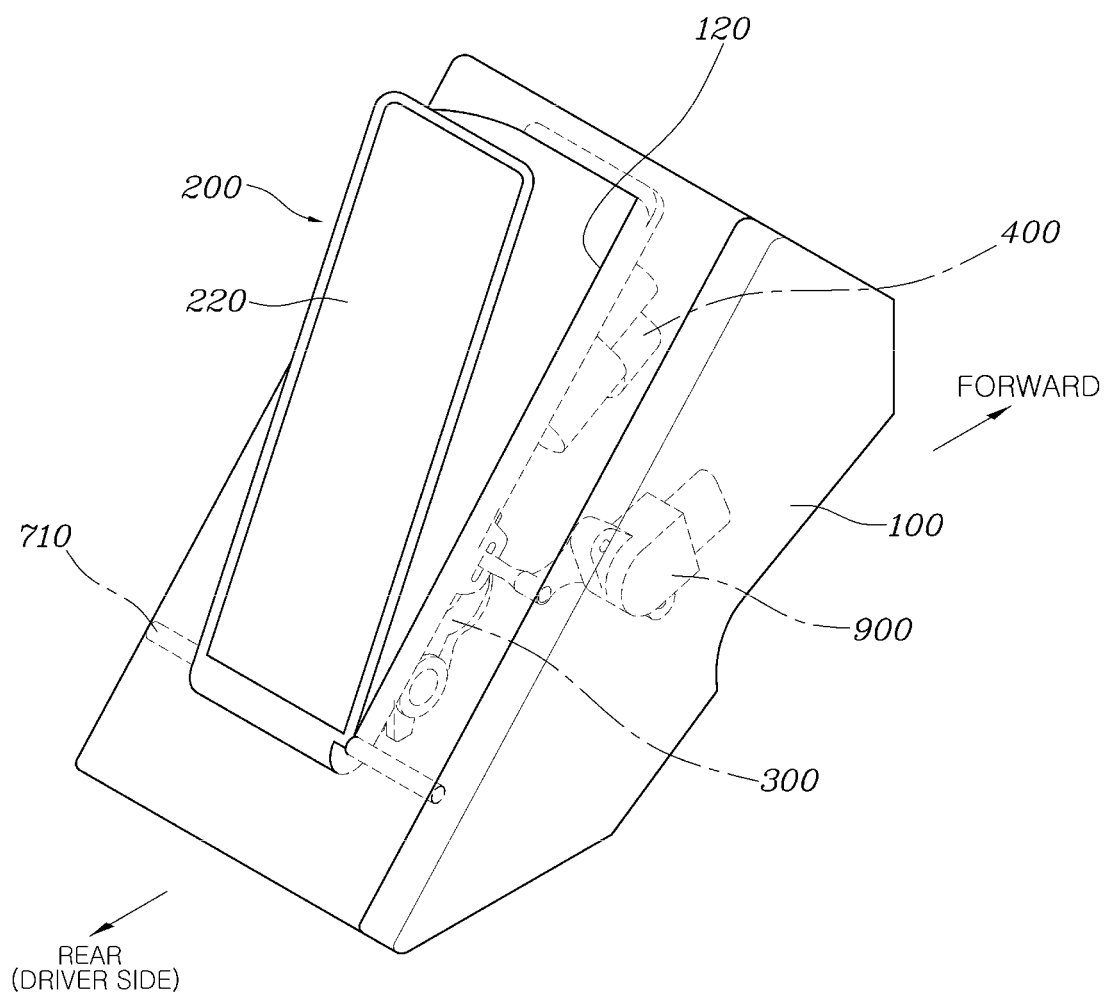
FIG. 2 is a perspective view illustrating a coupled state of FIG. 1.
Figure 3:
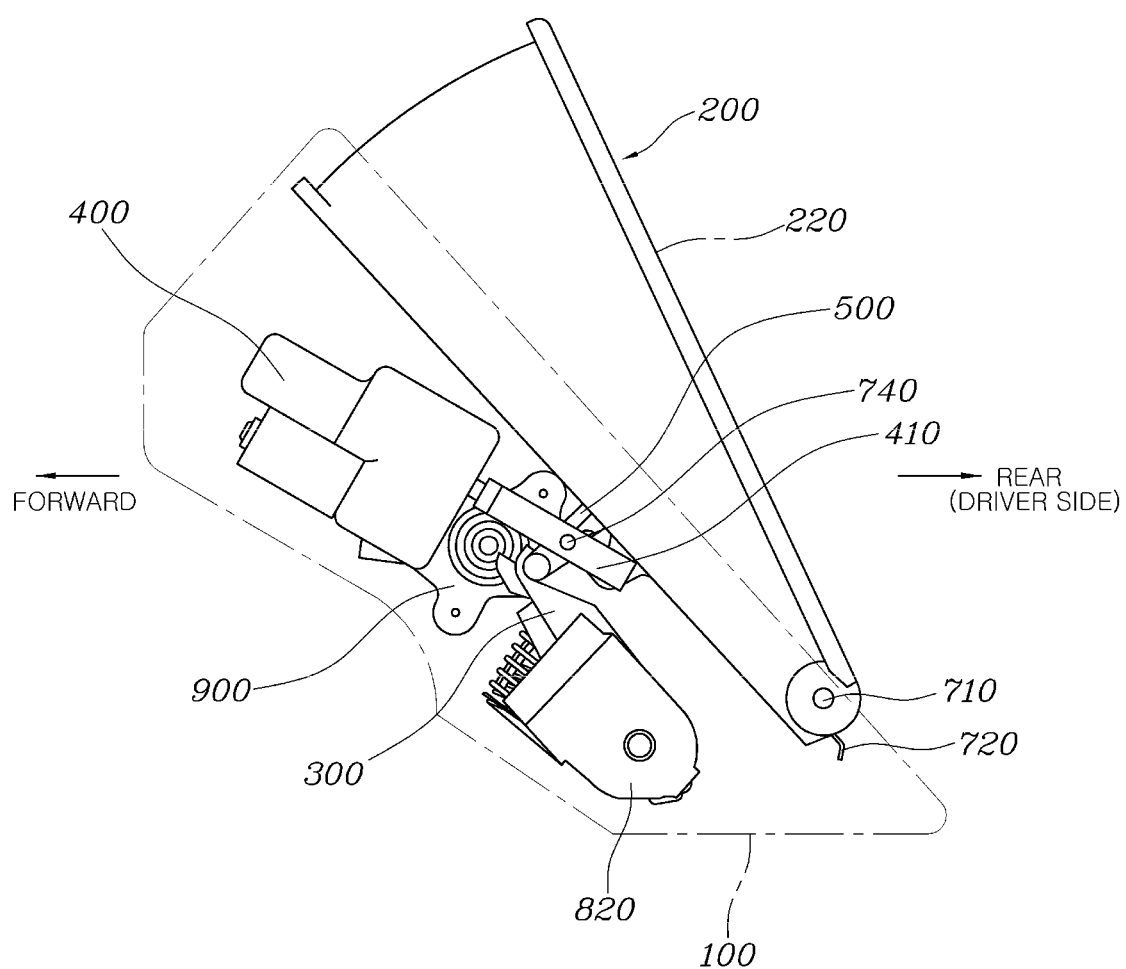
FIG. 3 is a left side view of FIG. 2.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Specific structural and functional descriptions will be provided only in order to describe various forms of the present disclosure disclosed in the present specification or application. Therefore, the forms of the present disclosure may be implemented in various forms, and are not to be interpreted as being limited to forms described in the present specification or application.

Since the forms of the present disclosure may be variously modified and may have several forms, specific forms will be illustrated in the accompanying drawings and will be described in detail in the present specification or application. However, this is not intended to limit the form according to the concept of the present disclosure to a specific disclosure form, and it should be understood to include all modifications, equivalents, or substitutes included in the spirit and scope of the present disclosure.

Terms such as first and second may be used to describe various components, but the components should not be limited by the terms. The terms are used only to distinguish one component from another component. For example, the first component may be referred to as the second component, and similarly, the second component may also be referred to as the first component, without departing from the scope of the present disclosure.

It is to be understood that when one element is referred to as being "coupled to" or "connected to" another element, it may be directly coupled to or directly connected to another element or be coupled to or connected to another element while having the other element interposed therebetween. On the other hand, when it is mentioned that any component is "directly coupled" or "directly connected" to another component, it is to be understood that any component may be coupled or connected to the other element without another component interposed therebetween. Other expressions describing a relationship between the components, that is, "between", "directly between", "neighboring to", "directly neighboring to" and the like, should be similarly interpreted.

The terms used in the present specification are only used to describe specific forms, and are not intended to limit the present disclosure. Singular expressions include plural expressions unless the context clearly indicates otherwise. It should be further understood that the term "include" or "constituted" used in the application specifies the presence of features, numerals, steps, operations, components, parts mentioned in the specification, or combinations thereof, but do not preclude the presence or addition of one or more other features, numerals, steps, operations, components, parts, or combinations thereof.

Unless defined otherwise, all the terms including technical and scientific terms have the same meaning as meanings generally understood by those skilled in the art to which the present disclosure pertains. Terms generally used and defined by a dictionary should be interpreted as having the same meanings as meanings within a context of the related art and should not be interpreted as having ideal or excessively formal meanings unless being clearly defined otherwise in the present specification.

A control unit (a controller) according to one form of the present disclosure may be implemented through a non-volatile memory (not illustrated) configured to store algorithm configured to control the operations of various components of the vehicle or data related to software instructions reproducing the algorithm, and a processor (not illustrated) configured to perform operations described below using the data stored in the memory. Here, the memory and the processor may be implemented as separate chips. Alternatively, the memory and the processor may be implemented as a single chip integrated with each other. The processor may take the form of one or more processors.

Hereinafter, a foldable accelerator pedal apparatus for a vehicle with a hysteresis module according to one form of the present disclosure will be described with reference to the accompanying drawings.

As illustrated in FIGS. 1 to 10, a foldable accelerator pedal apparatus according to the present disclosure includes a pedal housing 100 fixedly installed in a lower space of a driver's seat; a pedal pad 200 having one end rotatably coupled to the pedal housing 100 and manipulated by a foot of a driver; a hysteresis module 300 having one end rotatably installed on the pedal housing 100 at a fixed position in the pedal housing 100 and generating hysteresis when the driver manipulates the pedal pad 200; a straight type motor 400 fixedly installed in the pedal housing 100 and including a motor rod 410 that advances and retreats; and a rotation link 500 that is rotatably coupled to the pedal pad 200, is connected to the motor rod 410, and operates to contact the hysteresis module 300 or release the contact when the motor rod 410 advances and retreats.

The pedal pad 200 may be changed to a hidden (hide) state inserted into the pedal housing 100 and a pop-up state protruding from the pedal housing 100 through rotation of the rotation link 500 by the advance and retreat of the motor rod 410.

The pedal housing 100 is formed in a box shape with an empty inside, has one side formed to be opened, has the hysteresis module 300, the straight type motor 400, the rotation link 500, and an acceleration control printed circuit board (PCB), which will be described later, installed in the empty space therein, and has a cover 110 coupled to the opened one side in a detachable structure.

The straight type motor 400 may be configured as a linear motor and is configured to be electrically connected to a power supply device, and the motor rod 410 becomes a plunger that advances and retreats when the straight type motor 400 is operated.

In addition, the foldable accelerator pedal apparatus according to the present disclosure further includes a motor control PCB 600 that is fixedly installed on the pedal housing 100 and is electrically connected to the straight type motor 400 to control the operation of the straight type motor 400.

The motor control PCB 600 is configured to be electrically connected to a power supply device such as a battery through a wire.

The pedal pad 200 is an organ type pad having a lower end thereof rotatably coupled to the pedal housing 100 via a hinge pin 710, rotatably coupled and connected to the rotation link 500 at an upper portion of the hinge pin 710, and having an upper end rotating back and forth around the hinge pin 710.

In addition, the pedal pad 200 is provided with an inner space 210 opened downward, and when the pedal pad 200 is changed from the pop-up state to the hidden state, the straight type motor 400 is inserted into the inner space 210 of the pedal pad 200 (see FIG. 4), thereby having an efficient layout structure to significantly reduce a size of the pedal housing 100 and an overall external size of the accelerator pedal apparatus.

In the case of a foldable accelerator pedal apparatus with the hysteresis module, since the conventional structure is a structure in which the hysteresis module is not fixed at any one position of the pedal housing and the hysteresis module moves when the pedal pad is manipulated, the size of the pedal housing has to be made large in consideration of the movement of the hysteresis module, and the overall external size of the accelerator pedal apparatus has to be increased.

On the other hand, the structure according to the present disclosure is a configuration in which the hysteresis module 300 does not move when the pedal pad 200 is manipulated, and rotates only at a fixed position of the pedal housing 100, and compared to the conventional structure in which the hysteresis module moves, the size of the pedal housing 100 may be reduced, thereby reducing the overall external size of the accelerator pedal apparatus.

A housing hole 120 is formed on a rear surface of the pedal housing 100 toward the driver, and the lower end of the pedal pad 200 is rotatably coupled to the pedal housing 100 via the hinge pin 710 in a form penetrating through the housing hole 120.

Therefore, in the case in which an operating force of the straight type motor 400 is transmitted to the pedal pad 200 through the motor rod 410, the rotation link 500, and the hysteresis module 300, so that the pedal pad 200 rotates forward around the hinge pin 710, as the pedal pad 200 is inserted into the pedal housing 100 and becomes a hidden state, the pedal pad 200 becomes a hide state that may not be manipulated by the driver, and conversely, in the case in which the pedal pad 200 rotates toward the rear toward the driver, as the pedal pad 200 becomes a state protruding from the pedal housing 100, the pedal pad 200 becomes a pop-up state that may be manipulated by the driver.

The rear surface facing the driver from the pedal pad 200 becomes a manipulation surface 220 manipulated by the driver with the foot, and the manipulation surface 220 of the pedal pad 200 has an external size larger than that of the housing hole 120 so that the housing hole 120 is sealed by the manipulation surface 220 of the pedal pad 200 when the pedal pad 200 is rotated.

In the case in which the pedal pad 200 is fully rotated forward around the hinge pin 710, as the manipulation surface 220 of the pedal pad 200 does not pass through the housing hole 120, the manipulation surface 220 is supported by the pedal housing 100, whereby the forward rotation of the pedal pad 200 is naturally restricted.

In addition, when the housing hole 120 is sealed by the manipulation surface 220 of the pedal pad 200, it is advantageous in maintaining airtightness, and as a result, it is possible to prevent an inflow of foreign substances, and it is also possible to achieve a noise blocking effect toward the interior.

The foldable accelerator pedal apparatus according to the present disclosure further includes a hinge spring 720 having both ends fixed to the pedal housing 100 and the hinge pin 710 to provide elastic force to the pedal pad 200 so that the pedal pad 200 rotates in a direction into which the pedal pad 200 is inserted into the pedal housing 100.

In the case in which the contact with the hysteresis module 300 is released due to rotation of the rotation link 500 by the operation of the straight type motor 400, as the pedal pad 200 is rotated around the hinge pin 710 by the elastic force of the hinge spring 720 and is inserted into the pedal housing 100, the pedal pad 200 is changed to the hidden (hide) state.

On the other hand, a rod hole 411 extending along a longitudinal direction of the motor rod 410 is formed in the motor rod 410 to penetrate therethrough, and a link hole 510 extending along a longitudinal direction of the rotation link 500 is formed in the rotation link 500 to penetrate therethrough.

The rotation link 500 is in the form of penetrating through the rod hole 411 in a vertical direction, an upper end of the rotation link 500 is rotatably coupled with the pedal pad 200 via a pad connection pin 730, and the motor rod 410 and the rotation link 500 are connected to each other via a link connection pin 740 coupled to the motor rod 410 while penetrating through the link hole 510.

In addition, the lower end of the rotation link 500 protruding to a lower side of the rod hole 411 is in contact with the hysteresis module 300 or the contact thereof is released when the rotation link 500 is rotated by the advance and retreat of the motor rod 410. When the lower end of the rotation link 500 is released from contact with the hysteresis module 300, the pedal pad 200 rotates to be inserted into the pedal housing 100 by the elastic force of the hinge spring 720 and is changed to the hidden (hide) state (see FIG. 4), and when the lower end of the rotation link 500 is in contact with the hysteresis module 300, the pedal pad 200 is changed to the pop-up state protruding from the pedal housing 100 by a pushing operation of the rotation link 500 (see FIG. 6).

Figure 6:
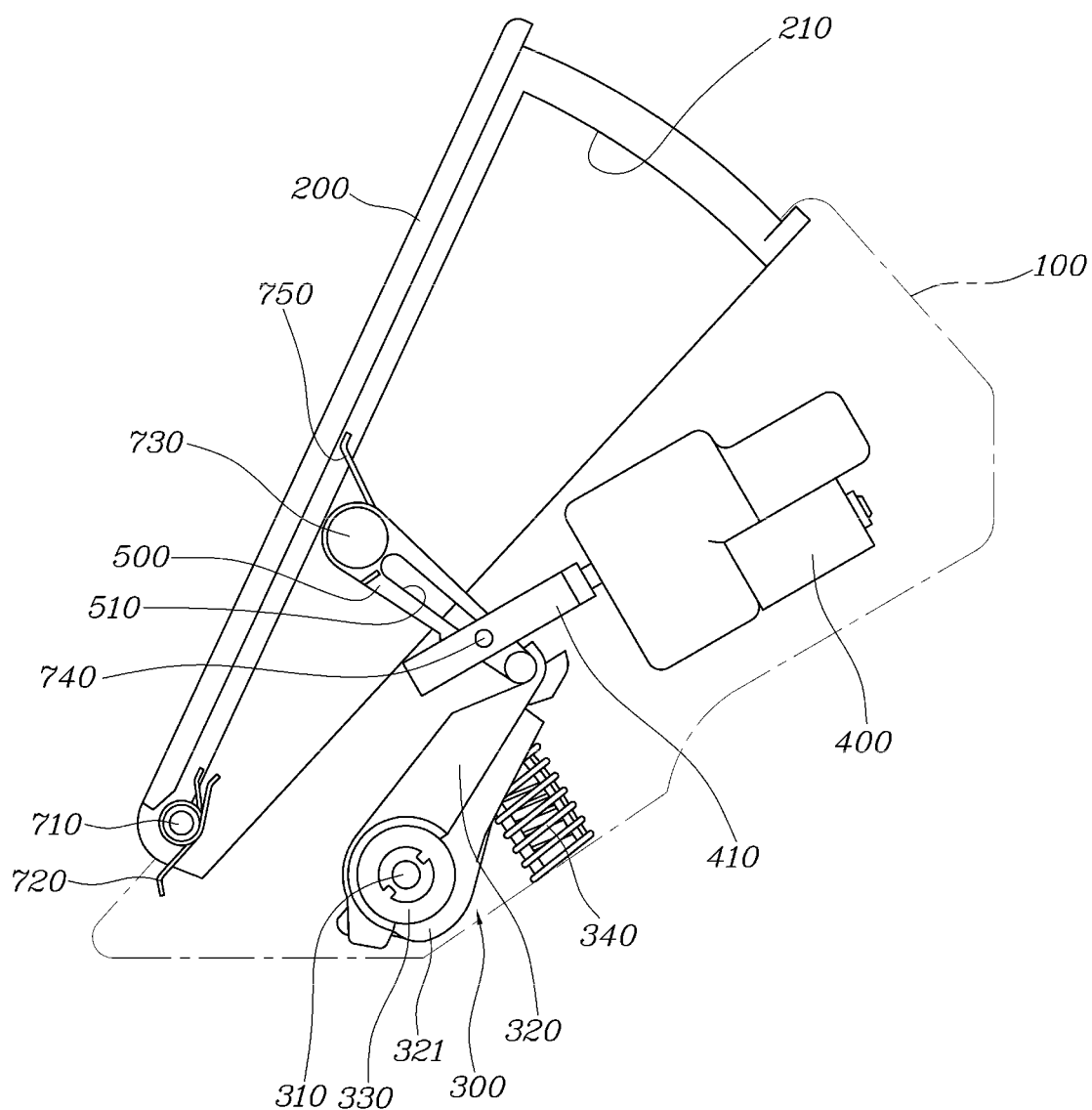
FIG. 6 is a view illustrating a pop-up state in which the pedal pad protrudes from the pedal housing.
Figure 7:
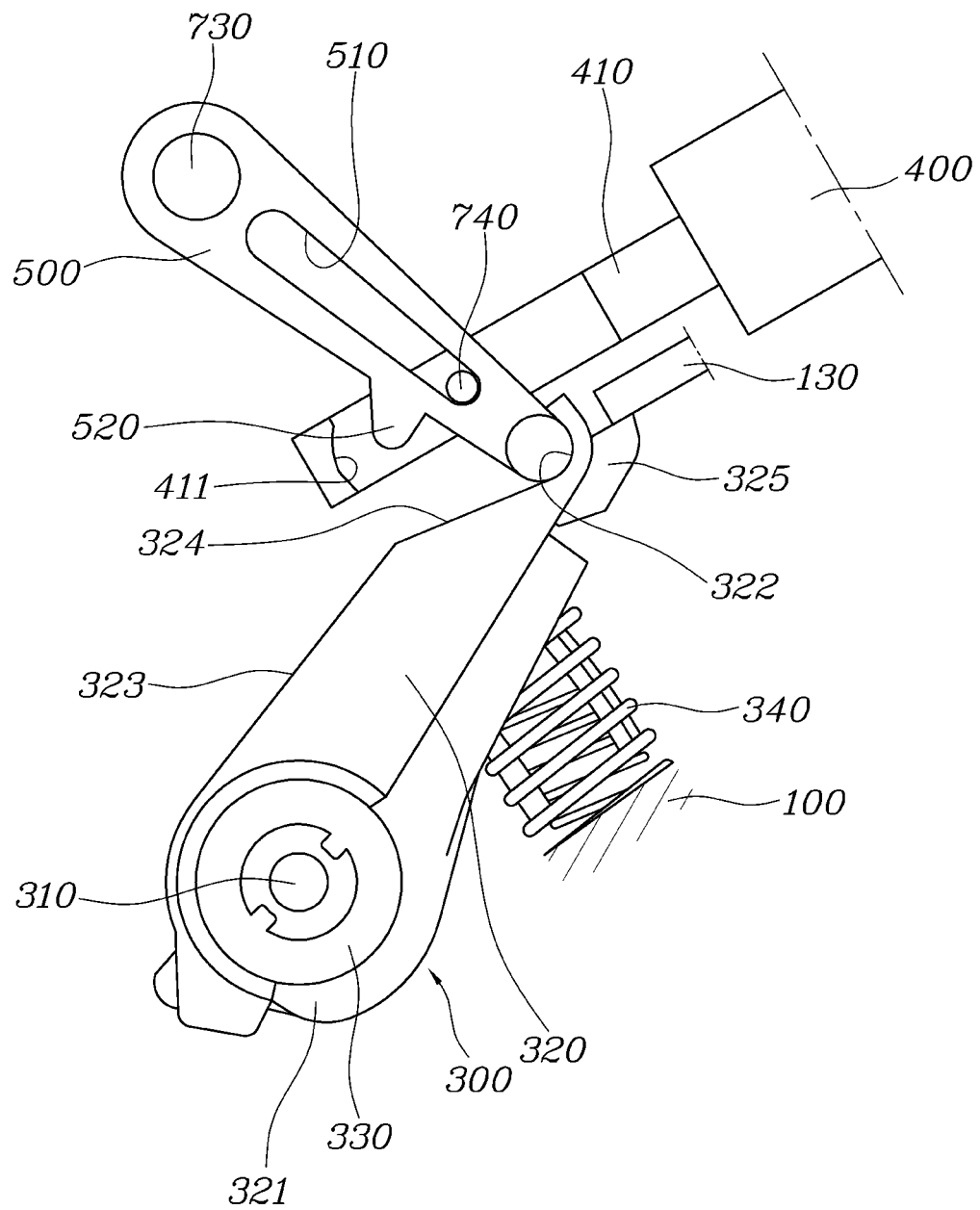
FIG. 7 is a view illustrating a state in which the pedal pad is removed from FIG. 6.

Meanwhile, the link hole 510 formed in the rotation link 500 is formed in a fan-shaped cross section whose cross-sectional area gradually increases from the lower end facing the hysteresis module 300 to the upper end facing the pad connection pin 730 based on the state in which the pedal pad 200 is popped up, as illustrated in FIGS. 6 and 7.

Figure 4:
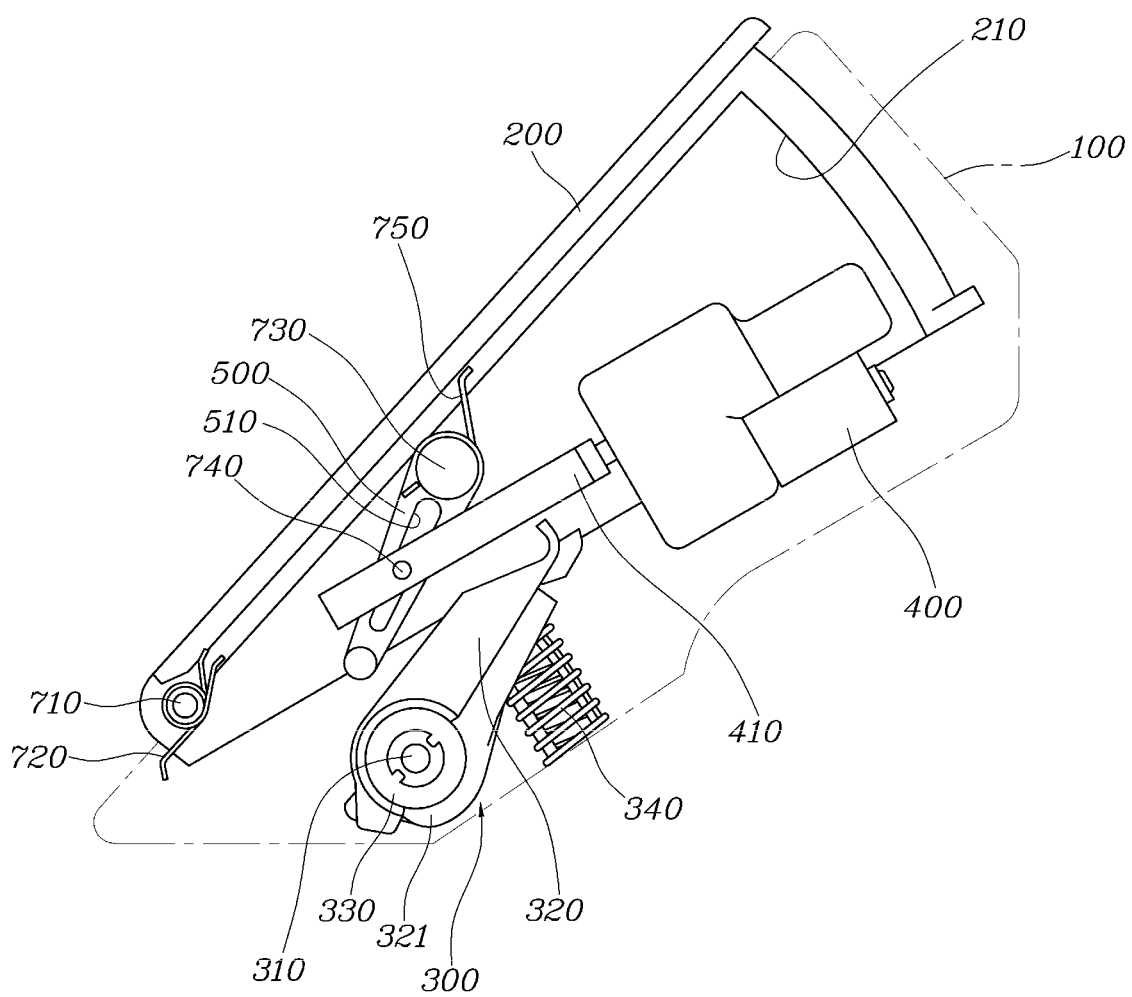
FIG. 4 is a view illustrating a hidden (hide) state in which a pedal pad is inserted into a pedal housing.
Figure 5:
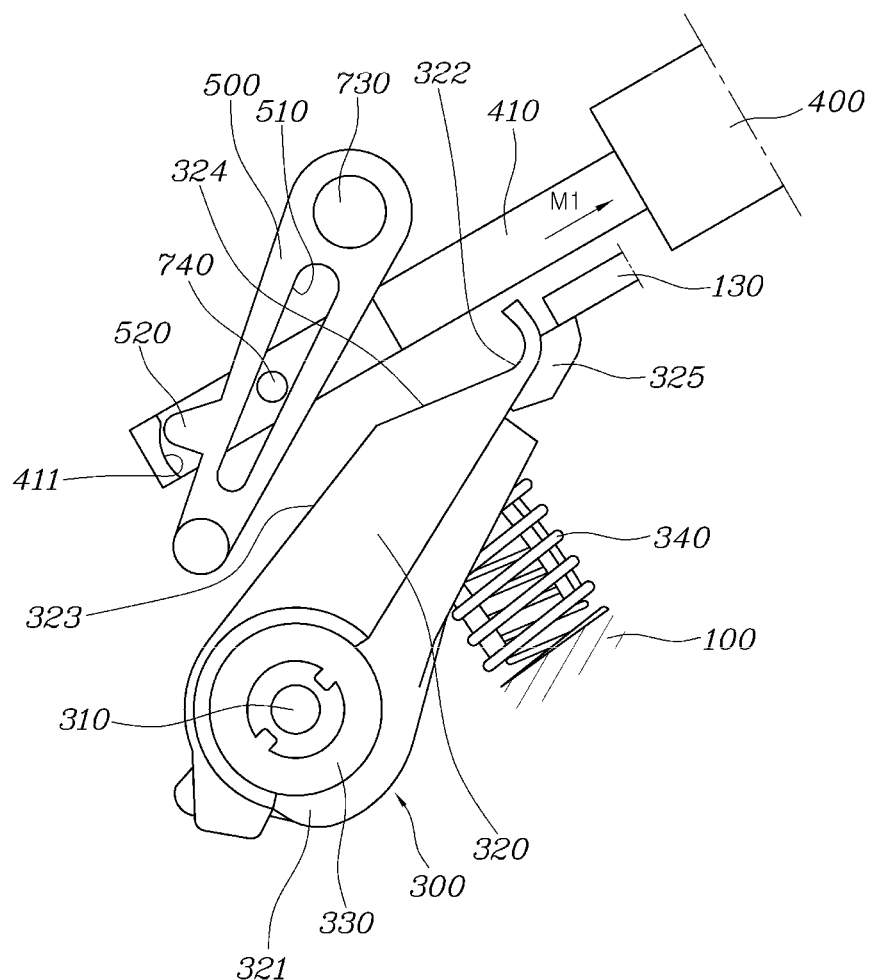
FIG. 5 is a view illustrating a state in which the pedal pad is removed from FIG. 4.
Figure 8:
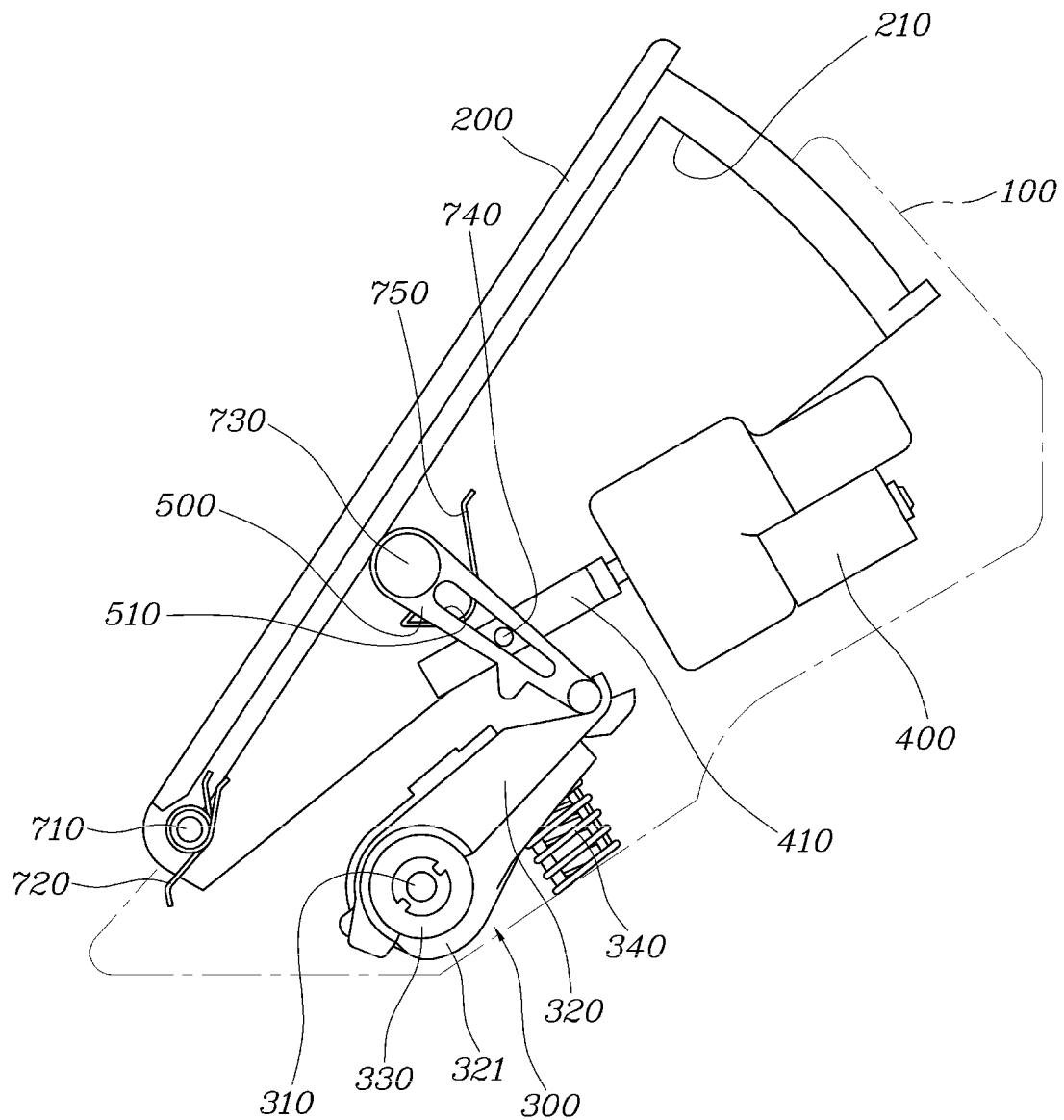
FIG. 8 is a view illustrating a state in which the popped-up pedal pad is rotated by a manipulation of a driver and operates normally.
Figure 9:
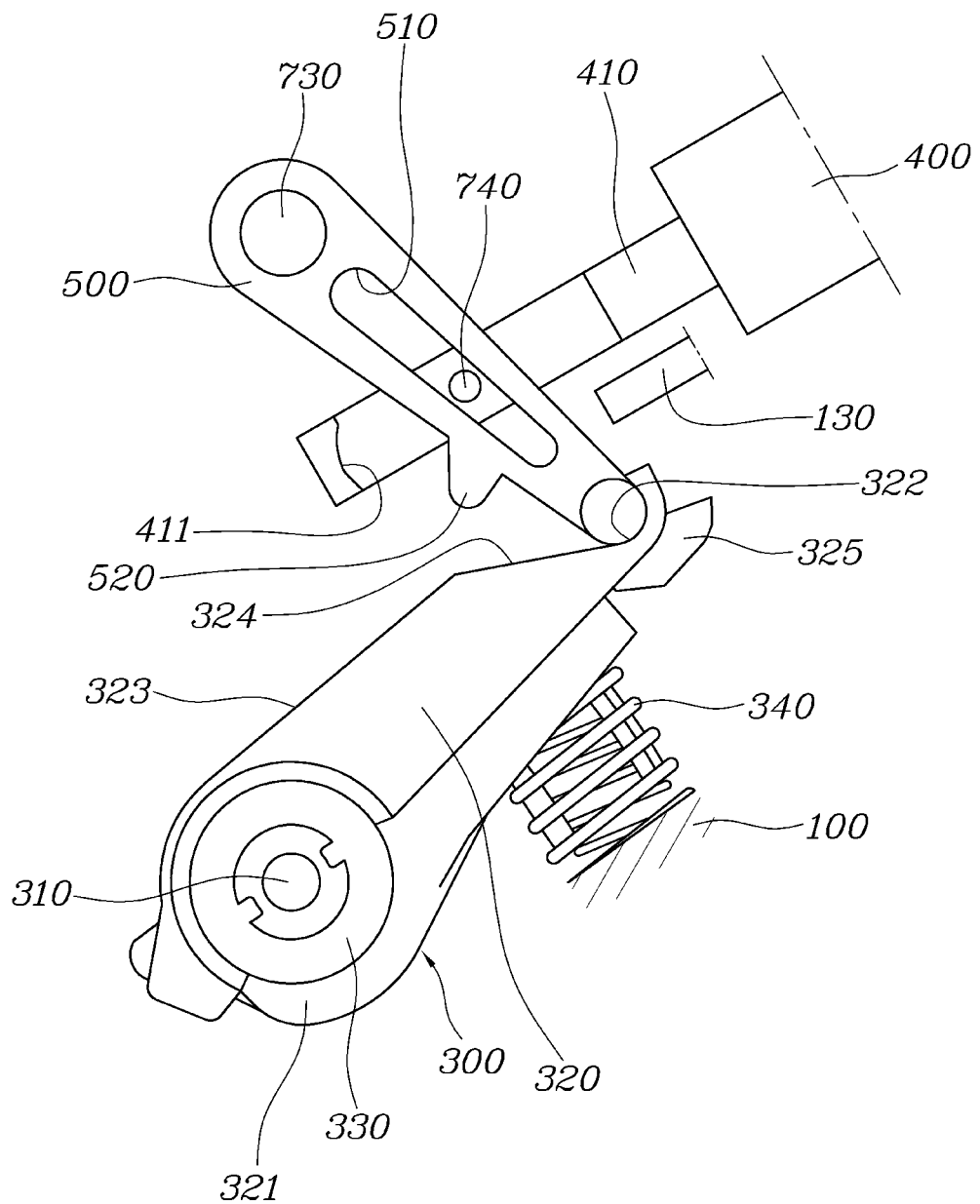
FIG. 9 is a view illustrating a state in which the pedal pad is removed from FIG. 8.

When the pedal pad 200 is changed from the pop-up state as illustrated in FIGS. 6 and 7 to the state in which the pedal pad 200 is hidden as illustrated in FIGS. 4 and 5, or when the driver manipulates the pedal pad 200 by stepping on the pedal pad 200 as illustrated in FIGS. 8 and 9 in the state in which the pedal pad 200 is popped up as illustrated in FIGS. 6 and 7, the pedal pad 200 rotates around the hinge pin 710 of the lower end thereof, the hysteresis module 300 also rotates around a central axis to be described later when the pedal pad 200 rotates, and at this time, the link connection pin 740 is moved at a position about the middle of the link hole 510.

However, when the link connection pin 740 positioned at the position about the middle of the link hole 510 is caught in the link hole 510 because a rotation trajectory of the pedal pad 200 and that of the hysteresis module 300 are different from each other, the pedal pad 200 and the hysteresis module 300 may not be rotated.

Therefore, according to the present disclosure, for smooth rotation of the pedal pad 200 and the hysteresis module 300 while absorbing left and right clearance caused by the difference in the rotation trajectory between the pedal pad 200 and the hysteresis module 300, the link hole 510 is may be formed in the fan-shaped cross section whose cross-sectional area gradually increases from the lower end to the upper end.

In addition, in the case in which the link hole 510 is formed in the fan-shaped cross section, when the pedal pad 200 is popped up, the link connection pin 740 is positioned at the lower end of the link hole 510, and a size of the lower end of the link hole 510 is formed to have a size substantially similar to a diameter of the link connection pin 740, thereby restricting a horizontal flow of the link connection pin 740. As a result, in the state in which the pedal pad 200 is popped up, unnecessary flow and vibration of the rotation link 500 may be prevented, and further, unnecessary flow and vibration of the pedal pad 200 may be prevented.

According to the present disclosure, a link protrusion 520 is formed to protrude on one surface of the rotation link 500, and the link protrusion 520 is positioned in the rod hole 411 while being positioned below the pad connection pin 730 when the pedal pad 200 is in the hidden (hide) state as illustrated in FIGS. 4 and 5, and maintains a contact state with one end of the rod hole 411 in the rod hole 411.

As such, in the case in which the link protrusion 520 of the rotation link 500 maintains the contact state with one end of the rod hole 411 while being positioned below the pad connection pin 730 when the pedal pad 200 in the hidden state, there is no clearance between the motor rod 410 and the link protrusion 520, and as a result, when the motor rod 410 retreats to be inserted into the straight type motor 400 by the operation of the straight type motor 400 (an arrow M1 in FIG. 5), as the operating force of the motor rod 410 is directly transmitted to the rotation link 500 through the link protrusion 520, there is an advantage that an operating responsiveness may be greatly improved.

The hysteresis module 300 according to the present disclosure includes a lever member 320 having one end of a hinge portion 321 rotatably coupled to the pedal housing 100 via a central shaft 310, and the other end provided with a seating groove portion 322 so that the lower end of the rotation link 500 is seated when the pedal pad 200 is popped up, a friction bush 330 that is coupled to the central shaft 310 and generates a friction force by contact with the lever member 320 when the lever member 320 rotates, and a lever spring 340 having both ends installed to be supported by the pedal housing 100 and the lever member 320 to provide an elastic force to the lever member 320 so that the lever member 320 rotates toward the pedal pad 200.

Based on the state in which the pedal pad 200 is popped up as illustrated in FIGS. 6 and 7, when the pedal pad 200 rotates forward around the hinge pin 710 as the driver manipulates the pedal pad 200 by stepping on the pedal pad 200 with the foot, the rotation link 500 connected to the pedal pad 200 moves downward as illustrated in FIGS. 8 and 9 in a state guided by the link connection pin 740, the lever member 320 rotates around the central shaft 310 by the movement of the rotation link 500, and at this time, the lever spring 340 accumulates the elastic force while being compressed, and when the driver releases the manipulation force from the pedal pad 200, the lever member 320, the rotation link 500, and the pedal pad 200 return to the pop-up state as illustrated in FIGS. 6 and 7 by a restoring force of the lever spring 340.

The lever spring 340 is capable of tuning a pedal effort through the tuning of a spring force, and in one form, the spring force is configured by two different springs so as to suppress minute vibration of the pedal pad 200, but the number of springs is not limited to two.

In another form, the lever spring 340 is a compression coil spring.

In the case in which the driver manipulates the pedal pad 200 by stepping on the pedal pad 200, as the spring force (compression force) of the lever spring 340 and the friction force of the friction bush 330 are generated together and act as a resistance force, it requires a large pedal effort to overcome such a large resistance force (a pedal effort at the time of manipulation), and in the case in which the pedal pad 200 returns as the driver releases the manipulation force from the pedal pad 200, as only the friction force by the friction bush 330 is generated, the pedal effort (the pedal effort at the time of return) is relatively reduced than the pedal effort at the time of manipulation.

As such, since a difference between the pedal effort when manipulating the pedal pad 200 and the pedal effort when returning is caused by the friction bush 330 corresponding to a friction element, such a phenomenon is called hysteresis in the pedal apparatus.

The hysteresis of the accelerator pedal prevents a sudden change in the amount of pressure of the accelerator pedal when an impact occurs due to irregularities on the road, thereby promoting quiet driving, and is an element to reduce the driver's ankle fatigue by keeping the amount of pressure on a pedal arm constant during constant speed driving or long driving.

According to the present disclosure, when the driver manipulates the pedal pad 200 by stepping on the pedal pad 200, most of the manipulation force of the driver is supported by the pedal housing 100 through the pedal pad 200, the rotation link 500, and the hysteresis module 300, and as a result, since it is possible to minimize the capacity of the straight type motor 400, there is an advantage of reducing cost and weight.

The seating groove portion 322 of the lever member 320 is formed in an arc shape surrounding the lower end of the rotation link 500, and as a result, the lower end of the rotation link 500 is inserted into the seating groove portion 322 having the arc shape and supported in a stable state.

In addition, the seating groove portion 322 and an upper surface 323 of the lever member 320 are connected by an inclined surface 324, and as a result, as illustrated in FIGS. 8 and 9, when the driver manipulates the pedal pad 200 by stepping on the pedal pad 200 in the state in which the pedal pad 200 is popped up, a phenomenon that the lower end of the rotation link 500 is separated from the upper surface 323 of the lever member 320 by an edge where the upper surface 323 and the inclined surface 324 meet is prevented. As a result, the pedal pad 200 and the hysteresis module 300 may rotate in a stable state.

Figure 10:
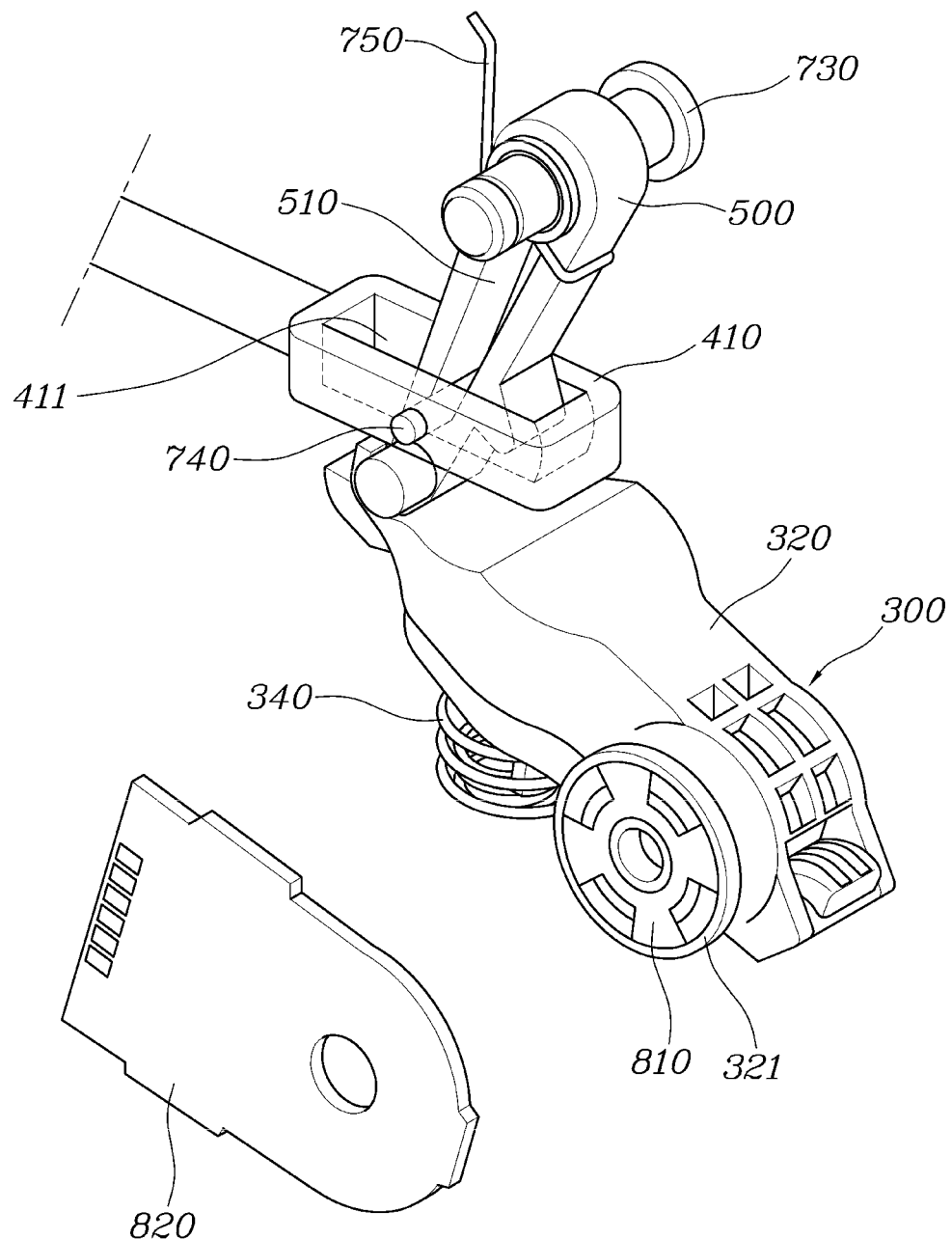
FIG. 10 is a view for describing a permanent magnet and an acceleration control PCB according to the present disclosure.

In one form, a lever protrusion 325 of the lever member 320 protrudes outward from an end portion where the seating groove portion 322 is formed in the lever member 320 of the hysteresis module 300, and a stopper protrusion 130 is formed on the pedal housing 100. In particular, the lever protrusion 325 of the lever member 320 protrudes in opposite direction to the seating groove portion 322 as shown in FIGS. 9-10.

Therefore, as illustrated in FIGS. 4 and 5, when the pedal pad 200 is in the hide state, the rotation of the lever member 320 toward the pedal pad 200 is restricted due to a contact between the lever protrusion 325 and the stopper protrusion 130, thereby preventing the hysteresis module 300 from being displaced.

The foldable accelerator pedal apparatus according to the present disclosure further includes a pad spring 750 having both ends fixed to the pedal pad 200 and the pad connection pin 730 to provide elastic force to the rotation link 500 so that the lower end of the rotation link 500 faces the seating groove portion 322 of the lever member 320.

Therefore, as illustrated in FIGS. 6 and 7, when the pedal pad 200 is in the pop-up state, the lower end of the rotation link 500 may maintain a state inserted in a stable state into the seating groove portion 322 of the lever member 320 by a spring force of the pad spring 750.

In addition, as illustrated in FIGS. 6 and 7, even when the pedal pad 200 is in the pop-up state, the lever protrusion 325 and the stopper protrusion 130 maintain a contact state.

In addition, the foldable accelerator pedal apparatus according to the present disclosure further includes a permanent magnet 810 coupled to the hinge portion 321 of the lever member 320, and an acceleration control PCB 820 fixedly installed on the pedal housing 100 so as to face the permanent magnet 810, as illustrated in FIG. 10.

The acceleration control PCB 820 is an accelerator position sensor (APS) that detects the rotation of the lever member 320 when the driver manipulates the pedal pad 200 by stepping on the pedal pad 200, and generates a signal related to acceleration by detecting a rotation angle of the pedal pad 200 through a change in magnetic field strength according to a change in a position of the permanent magnet 810 when the lever member 320 rotates.

The acceleration control PCB 820 is a non-contact pedal sensor electrically connected to a power supply device such as a battery through a wire, and has an advantage in that it may reduce operating noise and in particular, may further increase an accuracy of an output signal, as compared to a contact sensor directly connected through a link or the like.

The pedal pad 200 may have a structure connected to a stroke sensor 900 through a link 910, the stroke sensor 900 may be fixedly installed on the pedal housing 100, and the stroke sensor 900 serves to detect whether the pedal pad 200 returns to an initial position when the pedal pad 200 is manipulated.

FIGS. 4 to 5 illustrate a state in which the pedal pad 200 is rotated forward due to the operation of the straight type motor 400 and is hidden to be inserted into the pedal housing 100, and accordingly, the pedal pad 200 is in the hide state in which the exposure is blocked.

When the motor rod 410 performs a forward movement that protrudes from the straight type motor 400 by the operation of the straight type motor 400 (a state moved to the left), the rotation link 500 rotates clockwise around the pad connection pin 730, and the contact between the lower end of the rotation link 500 and the hysteresis module 300 is released by the rotation of the rotation link 500, the pedal pad 200 becomes the hidden (hide) state inserted into the pedal housing 100 as it rotates forward around the hinge pin 710 at the lower end by the elastic force of the hinge spring 720.

In the case in which the pedal pad 200 becomes the hidden (hide) state as described above, as a lower space of the driver's seat becomes a large space without pedal interference, the driver may take a comfortable rest in a relaxation mode, and in addition, it is possible to improve safety by blocking mal-operation of the pedals in an autonomous driving situation.

FIGS. 6 and 7 illustrate a pop-up state in which the pedal pad 200 protrudes from the pedal housing 100 by rotating to the rear where the driver is present.

In the hidden (hide) state of the pedal pad as described above, when the motor rod 410 performs a reverse movement that is inserted into the straight type motor 400 by the operation of the straight type motor 400 (a state moved to the right), the rotation link 500 rotates counterclockwise around the pad connection pin 730, and the lower end of the rotation link 500 contacts the hysteresis module 300 by the rotation of the rotation link 500 and is finally inserted into the seating groove portion 322 of the lever member 320 and seated therein, the pedal pad 200 is in the pop-up state protruding from the pedal housing 100 by rotating to the rear toward the driver around the hinge pin 710.

When the pedal pad 200 is in the pop-up state protruding from the pedal housing 100 as described above, the driver performs a normal manipulation by stepping on a manipulation surface 220 of the protruding pedal pad 200.

FIGS. 8 and 9 illustrate a state in which the driver manipulates the pedal pad 200 by stepping on the pedal pad 200 popped up to protrude from the pedal housing 100 with a foot.

When the driver manipulates the pedal pad 200 by stepping on the pedal pad 200 popped up to protrude from the pedal housing 100 with the foot, the pedal pad 200 rotates forward around the hinge pin 710, the rotation link 500 connected to the pedal pad 200 moves downward while being guided by the link connection pin 740, and the lever member 320 rotates about the central shaft 310 by the movement of the rotation link 500. At this time, the lever spring 340 accumulates the elastic force while being compressed.

In addition, when the lever member 320 of the hysteresis module 300 rotates as the pedal pad 200 rotates by the manipulation of the driver, the permanent magnet 810 coupled to the hinge portion 321 of the lever member 320 also rotates and a position of the permanent magnet 810 according to the rotation is changed. At this time, the acceleration control PCB 820 generates a signal related to acceleration by detecting a rotation angle of the pedal pad 200 through a change in magnetic field strength according to a change in the rotation position of the permanent magnet 810.

In one form of the present disclosure, when the rotation link 500 and the hysteresis module 300 rotate due to the advance and retreat of the motor rod 410 according to the operation of the straight type motor 400, and the position of the permanent magnet 810 is changed due to the rotation of the hysteresis module 300, the acceleration control PCB 820 does not generate the signal related to acceleration to prevent a malfunction.

That is, when the pedal pad 200 is converted into the hidden (hide) state as illustrated in FIG. 4 and the pop-up state as illustrated FIG. 6 by the operation of the straight type motor 400, even if the position of the permanent magnet 810 is changed, the acceleration control PCB 820 does not generate the signal related to acceleration, thereby preventing an accident due to the malfunction.

However, in a situation in which the pedal pad 200 is in the pop-up state and the straight type motor 400 is not operated as illustrated in FIG. 6, only when the pedal pad 200 rotates by the manipulation of the driver, the rotation link 500 moves linearly by the rotation of the pedal pad 200, the hysteresis module 300 rotates by the linear movement of the rotation link 500, and the position of the permanent magnet 810 is changed due to the rotation of the hysteresis module 300, the acceleration control PCB 820 generates the signal related to acceleration, and as a result, a more stable operation may be achieved.

To this end, the straight type motor 400 is provided with a sensor capable of detecting a position of the motor rod 410, and the acceleration control PCB 820 determines whether or not the signal related to acceleration is generated using position information of the motor rod 410 detected through the sensor.

As described above, the foldable accelerator pedal apparatus according to the present disclosure has a configuration that protrudes the pedal pad from the pedal housing and popping-up the pedal pad to be exposed toward the driver so that the driver may manipulate the pedal pad in the manual driving mode in which the driver directly drives, may implement the hide state in which blocks exposure to the driver by inserting the pedal pad into the pedal housing so that the manipulation of the pedal pad by the driver is impossible in the autonomous driving situation in which the driver does not directly drive, and particularly, has a configuration including the hysteresis module so that hysteresis may be implemented, in which a comfortable rest for the driver is possible in the autonomous driving situation, and furthermore, safety may be improved by blocking maloperation of the pedals in the autonomous driving situation.

Further, the present disclosure has a configuration in which the straight type motor fixed to the pedal housing is accommodated in the inner space of the pedal pad when the pedal pad is in the hidden (hide) state inserted into the pedal housing, thereby having the efficient layout structure to significantly reduce the overall external size of the accelerator pedal apparatus.

Although the present disclosure has been shown and described with respect to specific forms, it will be apparent to those having ordinary skill in the art that the present disclosure may be variously modified and altered without departing from the spirit and scope of the present disclosure as defined by the following claims.

What is claimed is:

1. A foldable accelerator pedal apparatus for a vehicle, the foldable accelerator pedal apparatus comprising:
   a pedal housing;
   a pedal pad having a first end rotatably coupled to the pedal housing and manipulated by a foot of a driver;
   a hysteresis module having a first end rotatably installed on the pedal housing at a fixed position in the pedal housing and configured to generate hysteresis when the driver manipulates the pedal pad;
   a straight type motor fixedly installed in the pedal housing and including a motor rod configured to advance and retreat; and
   a rotation link rotatably coupled to the pedal pad, connected to the motor rod, and configured to contact the hysteresis module when the motor rod retreats and to be disconnected from the hysteresis module when the motor rod advances,
   wherein the pedal pad is configured to switch between a hidden state and a pop-up state when the motor rod advances and retreats, and
   wherein in the hidden state, the pedal pad is inserted into the pedal housing, and in the pop-up state, the pedal pad protrudes from the pedal housing.

2. The foldable accelerator pedal apparatus of claim 1, further comprising: a motor control printed circuit board (PCB) fixedly installed on the pedal housing, electrically connected to the straight type motor, and configured to control an operation of the straight type motor.

3. The foldable accelerator pedal apparatus of claim 1, wherein:
   the pedal pad is provided with an inner space opened downward, and
   when the pedal pad is changed from the pop-up state to the hidden state, the straight type motor is inserted into the inner space of the pedal pad.

4. The foldable accelerator pedal apparatus of claim 1, wherein the pedal pad is an organ type pad having a lower end thereof rotatably coupled to the pedal housing via a hinge pin, connected to the rotation link at an upper portion of the hinge pin, and having an upper end rotating back and forth around the hinge pin.

5. The foldable accelerator pedal apparatus of claim 4, further comprising a hinge spring having both ends fixed to the pedal housing and the hinge pin and configured to provide an elastic force to the pedal pad so that the pedal pad rotates in a direction in which the pedal pad is inserted into the pedal housing,
   wherein when the contact with the hysteresis module is released due to rotation of the rotation link by the operation of the straight type motor, the pedal pad is rotated to be inserted into the pedal housing around the hinge pin by the elastic force of the hinge spring, thereby switching to the hidden state.

6. The foldable accelerator pedal apparatus of claim 1, wherein:
   a rod hole extending along a longitudinal direction of the motor rod is formed in the motor rod to penetrate therethrough,
   a link hole extending along a longitudinal direction of the rotation link is formed in the rotation link to penetrate therethrough,
   the rotation link is configured to penetrate through the rod hole in a vertical direction so that an upper end thereof is rotatably coupled with the pedal pad via a pad connection pin, and
   the motor rod and the rotation link are connected to each other via a link connection pin coupled to the motor rod while penetrating through the link hole.

7. The foldable accelerator pedal apparatus of claim 6, wherein:
   a lower end of the rotation link protruding to a lower side of the rod hole is in contact with the hysteresis module or the contact thereof is released when the rotation link is rotated by the advance and retreat of the motor rod,
   when the lower end of the rotation link is released from the contact with the hysteresis module, the pedal pad is configured to rotate and be inserted into the pedal housing and thus is switched to the hidden state, and
   when the lower end of the rotation link is in contact with the hysteresis module, the pedal pad is switched to the pop-up state protruding from the pedal housing by a pushing operation of the rotation link.

8. The foldable accelerator pedal apparatus of claim 6, wherein the link hole includes a first end facing the hysteresis module and a second end facing the pad,
   wherein a width of the link hole continuously increases from the first end to the second end along the longitudinal direction of the rotation link.

9. The foldable accelerator pedal apparatus of claim 6, wherein:
   a link protrusion is formed to protrude on one surface of the rotation link, and
   the link protrusion is positioned in the rod hole while being positioned below the pad connection pin when the pedal pad is in the hidden state, and configured to maintain a contact state with one end of the rod hole.

10. The foldable accelerator pedal apparatus of claim 6, wherein the hysteresis module includes:
    a lever member having a hinge portion rotatably coupled to the pedal housing at a first end of the hinge portion via a central shaft, wherein a second end of the hinge portion is provided with a seating groove portion so that a lower end of the rotation link is seated when the pedal pad is popped up,
    a friction bush coupled to the central shaft and configured to generate a friction force by contact with the lever member when the lever member rotates, and
    a lever spring having ends supported by the pedal housing and the lever member and configured to provide an elastic force to the lever member so that the lever member rotates toward the pedal pad.

11. The foldable accelerator pedal apparatus of claim 10, wherein:
the seating groove portion of the lever member is formed in an arc shape surrounding the lower end of the rotation link, and
the seating groove portion and an upper surface of the lever member are connected by an inclined surface.

12. The foldable accelerator pedal apparatus of claim 10, wherein:
the lever member includes a lever protrusion protruding outward from an end portion where the seating groove portion is formed in the lever member,
a stopper protrusion is formed on the pedal housing, and
when the pedal pad is in the hidden state or the pop-up state, the rotation of the lever member toward the pedal pad is restricted due to a contact between the lever protrusion and the stopper protrusion.

13. The foldable accelerator pedal apparatus of claim 10, further comprising:
a pad spring having ends fixed to the pedal pad and the pad connection pin and configured to provide an elastic force to the rotation link so that the lower end of the rotation link faces the seating groove portion of the lever member.

14. The foldable accelerator pedal apparatus for a vehicle of claim 10, further comprising:
a permanent magnet coupled to the hinge portion of the lever member; and
an acceleration control PCB fixedly installed on the pedal housing so as to face the permanent magnet,
wherein the acceleration control PCB is configured to generate a signal corresponding to an acceleration by detecting a rotation angle of the pedal pad through a change in magnetic field strength according to a change in a position of the permanent magnet when the lever member rotates.

15. The foldable accelerator pedal apparatus of claim 14, wherein when the rotation link and the hysteresis module rotate due to the advance and retreat of the motor rod according to the operation of the straight type motor, and the position of the permanent magnet is changed due to the rotation of the hysteresis module, the acceleration control PCB does not generate the signal corresponding to the acceleration to prevent a malfunction.

16. The foldable accelerator pedal apparatus of claim 14, wherein in a situation in which the pedal pad is in the pop-up state and the straight type motor is not operated, only when the pedal pad rotates by the manipulation of the driver, the rotation link is configured to move linearly by the rotation of the pedal pad, the hysteresis module rotates by a linear movement of the rotation link, and the position of the permanent magnet is changed due to the rotation of the hysteresis module, the acceleration control PCB generates the signal corresponding to the acceleration.

17. The foldable accelerator pedal apparatus of claim 10, wherein when the motor rod retreats to be inserted into the straight type motor by the operation of the straight type motor, the rotation link is configured to rotate around the pad connection pin when the motor rod retreats, and the lower end of the rotation link is seated on the seating groove portion of the lever member, the pedal pad is in the pop-up state by rotating to protrude from the pedal housing.

18. The foldable accelerator pedal apparatus of claim 10, wherein when the motor rod advances to protrude from the straight type motor by the operation of the straight type motor, the rotation link is configured to rotate around the pad connection pin when the motor rod advances, and the contact between the lower end of the rotation link and the lever member is released, the pedal pad is in the hidden state.

* * * * *